(12) United States Patent
Lee et al.

(10) Patent No.: US 7,296,973 B2
(45) Date of Patent: Nov. 20, 2007

(54) PARALLEL SERPENTINE COOLED BLADE

(75) Inventors: Ching-Pang Lee, Cincinnati, OH (US); Aspi Rustom Wadia, Loveland, OH (US); Steven Robert Brassfield, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 187 days.

(21) Appl. No.: 11/294,063

(22) Filed: Dec. 5, 2005

(65) Prior Publication Data

US 2007/0128032 A1 Jun. 7, 2007

(51) Int. Cl.
*F01D 5/18* (2006.01)

(52) U.S. Cl. .................................... 416/97 R

(58) Field of Classification Search ............... 415/115; 416/96 R, 97 R
See application file for complete search history.

(56) References Cited

U.S. PATENT DOCUMENTS

| | | | |
|---|---|---|---|
| 4,413,949 A | 11/1983 | Scott | |
| 4,770,608 A | 9/1988 | Anderson et al. | |
| 5,156,526 A | 10/1992 | Lee et al. | |
| 5,165,852 A | 11/1992 | Lee et al. | |
| 5,193,980 A | 3/1993 | Kaincz et al. | |
| 5,356,265 A | 10/1994 | Kercher | |
| 5,387,085 A | 2/1995 | Thomas et al. | |
| 5,498,133 A | 3/1996 | Lee | |
| 5,538,394 A | 7/1996 | Inomata et al. | |
| 5,626,462 A | 5/1997 | Jackson et al. | |
| 5,660,524 A | 8/1997 | Lee et al. | |
| 5,690,472 A | 11/1997 | Lee | |
| 5,690,473 A | 11/1997 | Kercher | |
| 5,720,431 A | 2/1998 | Sellers et al. | |
| 5,813,835 A | 9/1998 | Corsemeier et al. | |
| 5,931,638 A | 8/1999 | Krause et al. | |
| 6,036,441 A | 3/2000 | Manning et al. | |
| 6,514,042 B2 | 2/2003 | Kvasnk et al. | |
| 6,554,563 B2 | 4/2003 | Noe et al. | |
| 6,705,836 B2 * | 3/2004 | Bourriaud et al. | 416/97 R |
| 6,832,889 B1 | 12/2004 | Lee et al. | |
| 7,128,533 B2 * | 10/2006 | Liang | 416/97 R |
| 2005/0226726 A1 | 10/2005 | Lee et al. | |
| 2006/0222495 A1 * | 10/2006 | Liang | 416/97 R |

* cited by examiner

*Primary Examiner*—Ninh H. Nguyen
(74) *Attorney, Agent, or Firm*—William S. Andes; Francis L. Conte

(57) ABSTRACT

A turbine blade includes an airfoil having opposite pressure and suction sidewalls joined together at opposite leading and trailing edges and extending longitudinally from root to tip. A plurality of independent cooling circuits are disposed inside the airfoil correspondingly along the pressure and suction sidewalls thereof. A first serpentine circuit is disposed along the pressure sidewall. A second serpentine circuit is disposed along the suction sidewall in parallel with the first circuit. And a third impingement circuit is disposed at the leading edge forward of the first and second circuits.

20 Claims, 3 Drawing Sheets

PARALLEL SERPENTINE COOLED BLADE

BACKGROUND OF THE INVENTION

The present invention relates generally to gas turbine engines, and, more specifically, to turbine airfoil cooling.

In a gas turbine engine air is pressurized in a compressor and mixed with fuel in a combustor for generating hot combustion gases. Energy is extracted from the combustion gases in a high pressure turbine which powers the compressor, and further in a low pressure turbine which produces output power such as driving a fan in a typical turbofan aircraft engine application.

The high pressure turbine first receives the hottest combustion gases and is typically cooled for enhancing its durability and life. A high pressure turbine nozzle initially directs the hot combustion gases into the first row of high pressure turbine rotor blades extending radially outwardly from a supporting rotor disk.

The vanes and blades have suitable airfoil configurations for efficiently extracting energy from the combustion gases. The vane airfoils are hollow and suitably mounted at their radially outer and inner ends in corresponding stationary stator bands.

Each turbine blade includes a hollow airfoil and integral supporting dovetail which is mounted in a corresponding dovetail slot in the perimeter of the rotor disk for retention thereof. The row of rotor blades rotates during operation on the supporting disk for extracting energy from the combustion gases and driving the engine compressor.

Both the turbine nozzle vanes and turbine rotor blades require suitable cooling thereof during operation by providing thereto cooling air bled from the compressor. It is desirable to minimize the amount of cooling air bled from the compressor for maximizing efficiency and performance of the engine.

Accordingly, cooling configurations for the stator vanes and rotor blades have become quite sophisticated and esoteric over the many decades of continuing development thereof. Minor changes in cooling configurations of these components have significant affect on the cooling performance thereof, and in turn significantly affect efficiency and performance of the entire engine.

The airfoils of the vanes and blades may use similar cooling features, but suitably modified for the different configurations of the vanes and blades, and their different operation since the vanes are stationary, whereas the blades rotate during operation and are subject to considerable centrifugal forces.

The hollow airfoils of the vanes and blades typically have multiple radially or longitudinally extending cooling channels therein in one or more independent cooling circuits. The channels typically include small ribs or turbulators along the inner surface of the airfoils which trip the cooling air for enhancing heat transfer during the cooling process.

Typical cooling circuits include serpentine circuits wherein the cooling air is channeled successively through the serpentine legs for cooling the different portions of the airfoil prior to discharge therefrom.

The vanes and blades typically include various rows of film cooling holes through the pressure and suction sidewalls thereof which discharge the spent cooling air in corresponding films that provide additional thermal insulation or protection from the hot combustion gases which flow thereover during operation.

Yet another conventional cooling configuration includes separate impingement baffles or inserts disposed inside the nozzle vanes for impingement cooling the inner surface thereof. The baffles include a multitude of small impingement holes which typically direct the cooling air perpendicular to the inner surface of the vane for impingement cooling thereof. The spent impingement cooling air is then discharged from the vane through the various film cooling holes.

Impingement cooling of turbine rotor blades presents the additional problem of centrifugal force as the blades rotate during operation. Accordingly, turbine rotor blades typically do not use separate impingement baffles therein since they are impractical, and presently cannot meet the substantially long life requirements of modern gas turbine engines.

Instead, impingement cooling a turbine rotor blade is typically limited to small regions of the blade such as the leading edge or pressure or suction sidewalls thereof. Impingement cooling is introduced by incorporating a dedicated integral bridge or partition in the airfoil having one or more rows of impingement holes. Turbine rotor blades are typically manufactured by casting, which simultaneously forms the internal cooling circuits and the local impingement cooling channels.

The ability to introduce significant impingement cooling in a turbine rotor blade is a fundamental problem not shared by the nozzle stator vanes. And, impingement cooling results in a significant pressure drop of the cooling air, and therefore requires a corresponding driving pressure between the inside and outside of the airfoils during operation.

Since the pressure distribution of the combustion gases as they flow over the pressure and suction sides of the airfoils varies accordingly, the introduction of impingement cooling in turbine rotor blades must address the different discharge pressure outside the blades relative to a common inlet pressure of the cooling air first received through the blade dovetails in a typical manner.

Accordingly, it is desired to provide a turbine rotor blade having improved internal cooling therein.

BRIEF DESCRIPTION OF THE INVENTION

A turbine blade includes an airfoil having opposite pressure and suction sidewalls joined together at opposite leading and trailing edges and extending longitudinally from root to tip. A plurality of independent cooling circuits are disposed inside the airfoil. A first serpentine circuit is disposed along the pressure sidewall. A second serpentine circuit is disposed along the suction sidewall in parallel with the first circuit. And a third impingement circuit is disposed at the leading edge forward of the first and second circuits.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
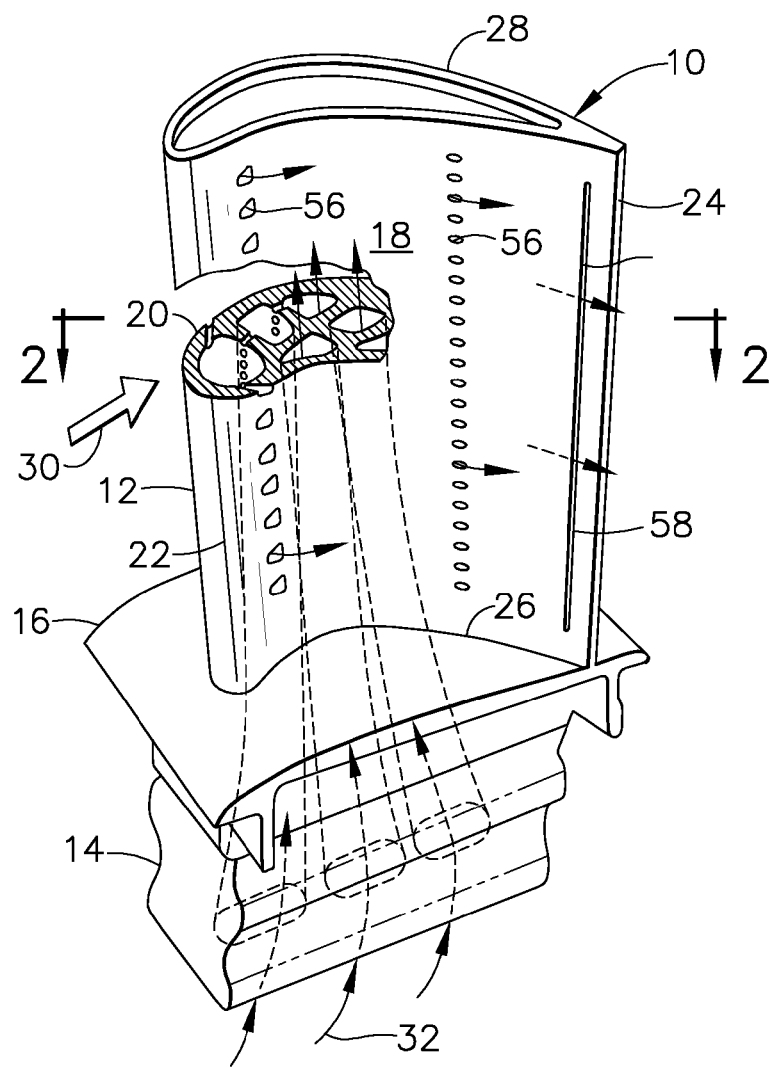
FIG. 1 is a partly sectional, isometric view of an exemplary gas turbine engine turbine rotor blade having three independent cooling circuits therein.

Illustrated in FIG. 1 is a gas turbine rotor blade 10 for use in a conventional gas turbine engine, such as a turbofan aircraft engine (not shown). The blade itself is typically manufactured using conventional casting techniques, and includes an airfoil 12 integrally joined to a mounting dovetail 14 at a platform 16.

The airfoil includes a generally concave pressure sidewall 18, and a circumferentially opposite, generally convex suction sidewall 20 integrally joined together at chordally opposite leading and trailing edges 22,24. The airfoil also extends longitudinally or radially in span from a radially inner root 26 at the platform 16 to a radially opposite tip 28.

During operation, the blade is mounted in a supporting rotor disk (not shown) by trapping the dovetail 14 in a complementary dovetail slot. In this way, centrifugal forces generated in the blade during rotary operation are carried through the lobes or tangs of the dovetail into the supporting rotor disk.

Hot combustion gases 30 are generated in a combustor (not shown) and flow over the external surfaces of the airfoil which extracts energy therefrom for rotating the rotor disk. As indicated above, the turbine rotor blade requires cooling for ensuring its durability and long useful life, and cooling air 32 is suitably bled from the high pressure compressor (not shown) of the engine during operation.

Figure 2:
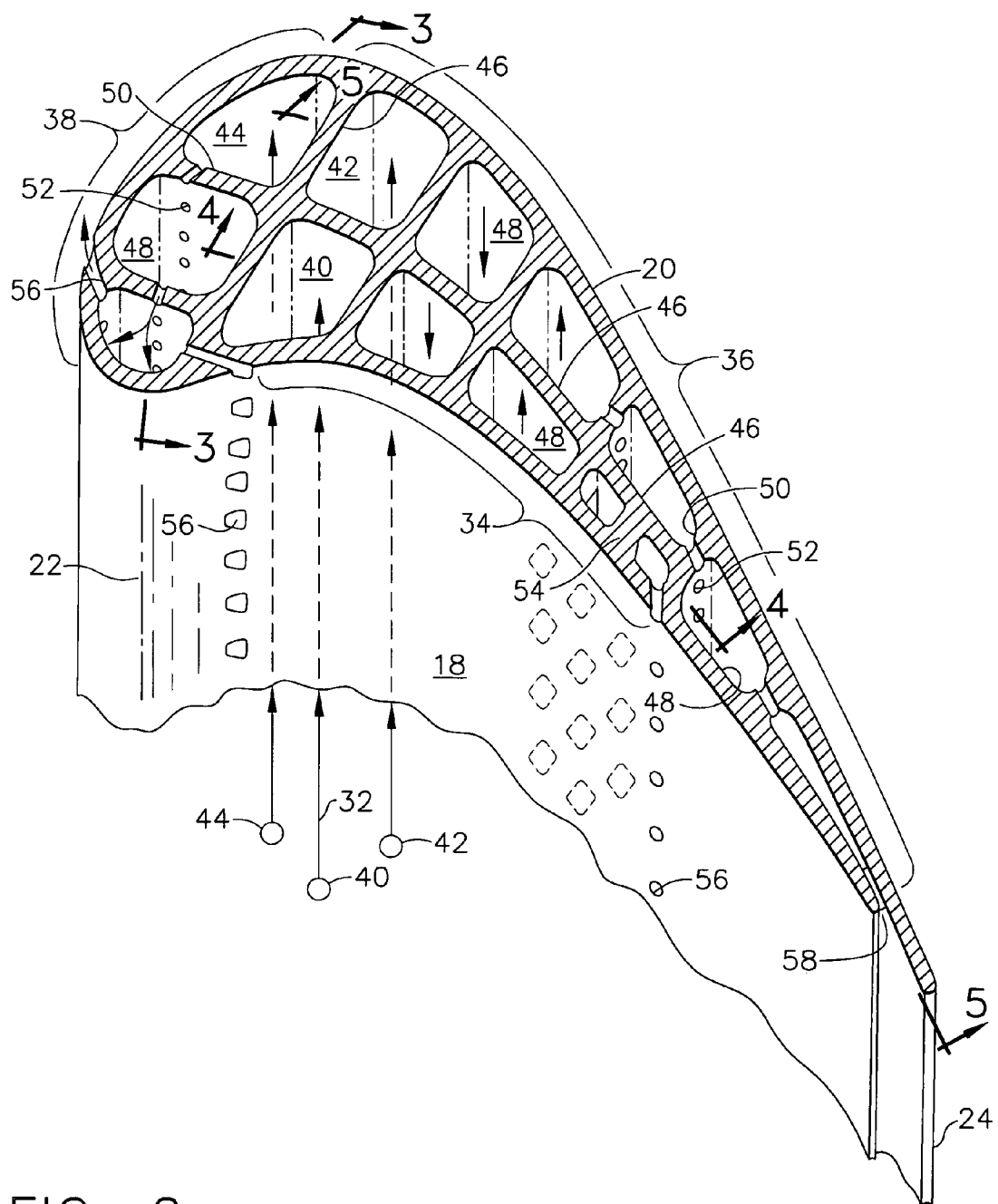
FIG. 2 is a partly sectional, isometric view of a portion of the airfoil illustrated in FIG. 1 and taken along line 2-2.

The airfoil 12 is illustrated in more detail in FIG. 2 and includes a plurality of independent cooling circuits 34,36,38 disposed inside the airfoil and extending longitudinally in span from root to tip thereof. The exemplary three cooling circuits extend correspondingly along the pressure and suction sidewalls 18,20, with each circuit including its own independent inlet channel 40,42,44. The three inlet channels extend longitudinally outwardly in the airfoil from root to just below the tip, and inwardly through the platform and dovetail to the base of the dovetail as illustrated in FIG. 1, for receiving the pressurized cooling air 32 suitably channeled thereto from the engine compressor.

The first serpentine cooling circuit 34 is disposed inside the airfoil 12 directly along the inner surface of the pressure sidewall 18, and is spaced between the leading and trailing edges 22,24. The second serpentine cooling circuit 36 is disposed inside the airfoil 12 directly along the inner surface of the suction sidewall 20 in parallel flow with the first circuit 34, and shares common imperforate partitions 46 therewith.

The third cascade impingement cooling circuit 38 is disposed directly behind the leading edge 22, and extends between the leading edge and the first and second circuits 34,36. The three circuits 34,36,38 are separated from each other by respective ones of the imperforate partitions 46 to form independent circuits for differently cooling the different portions of the airfoil against the different input heat flux from the combustion gases flowing outside the airfoil during operation.

The three inlet channels 40,42,44 are preferably grouped together and adjoin each other in the maximum width region of the airfoil directly behind the leading edge 22, and within about twenty-five percent of the chord length therefrom. The three inlet channels all receive in parallel flow the same pressure and temperature cooling air 32 from the inlet apertures in the base of the dovetail.

The three inlet channels themselves and the surrounding bulk region of the airfoil may therefore be adequately cooled by the initially received cooling air prior to distribution in the three cooling circuits. And, the imperforate partitions 46 that separate the three inlet channels from each other in the widest region of the airfoil avoid stress concentrations associated with cooling holes, and extend completely through the blade to the base of the dovetail to provide a rigid structure for carrying the substantial centrifugal loads to the supporting rotor disk.

Each of the three circuits 34-38 further includes multiple flow legs or channels 48 extending in span along the airfoil from root to tip, and joined in series flow from the respective inlet channels 40-44. The multiple flow channels 48 extend both the first and second serpentine circuits 34,36 in parallel aft to the trailing edge 24, and extend the third cascade circuit 38 forwardly to the leading edge 22.

In this configuration the first and second serpentine circuits 34,36 are separated from the leading edge 22 by the third circuit 38 which uses local impingement cooling to protect the leading edge region of the airfoil from the hot combustion gases. Impingement cooling requires a significant pressure drop in the cooling air between the cascade channels, whereas serpentine cooling requires substantially less pressure drop.

Pressure drop is a significant design constraint because the cooling air is bled from the compressor at a common pressure, and with a limited flowrate. That limited air must then be suitably divided and distributed within the various cooling circuits of the airfoil for cooling the different portions thereof against the different heat loads along the different pressure and suction sides from root to tip and between the leading and trailing edges.

Figure 3:
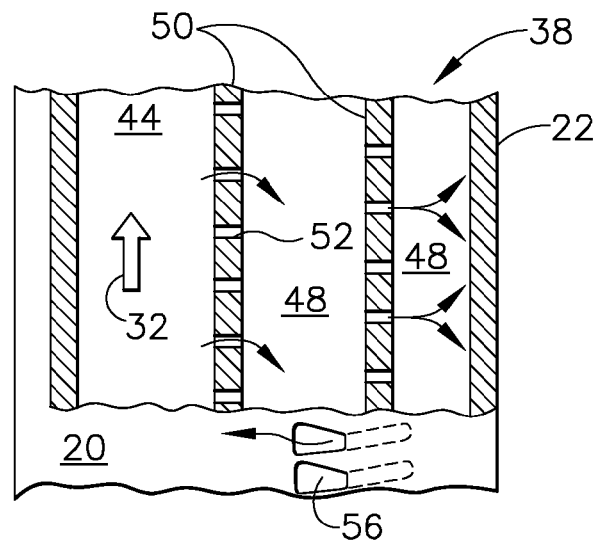
FIG. 3 is an elevational sectional view through a leading edge region of the airfoil illustrated in FIG. 2 and taken along line 3-3.

The third cooling circuit 38 is illustrated in FIGS. 2 and 3 and includes multiple cascade flow channels 48 extending longitudinally from root to tip of the airfoil and separated axially or chordally by corresponding perforate partitions or bridges 50. Each bridge includes a longitudinal row of impingement holes 52 extending obliquely therethrough for cascade impingement cooling in series the inner surface of the airfoil using the same air 32 received through the third inlet channel 44.

Accordingly, the third cascade cooling circuit 38 preferably commences aft of the leading edge near the midchord of the airfoil, and extends forwardly along the suction sidewall 20 and terminates immediately behind or at the leading edge 22. The third circuit 38 includes the third inlet channel 44 and preferably two cascade channels 48, with two corresponding perforate partitions 50.

The cooling air 32 is thusly channeled in series through the three channels of the cascade circuit 38 for providing two successive stages of impingement cooling in corresponding cascades extending over the radial span of the airfoil, finally providing impingement cooling directly behind the airfoil leading edge 22.

Cooperating with the cascade circuit 38 in selectively cooling the airfoil are the first and second serpentine circuits 34,36 disposed therebehind. The two serpentine circuits 34,36 each includes three flow legs or channels 48 extending along the airfoil span, and corresponding legs of these two circuits adjoin each other at common imperforate partitions 46 as shown in FIG. 2.

Figure 4:
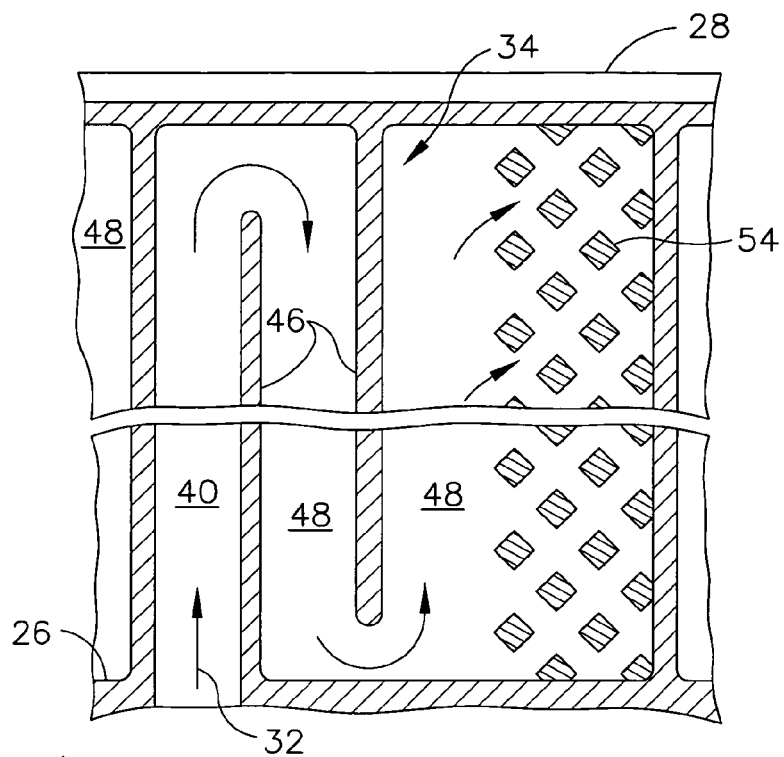
FIG. 4 is an elevational sectional view of a portion of the pressure-side circuit of the airfoil illustrated in FIG. 2 and taken along line 4-4.
Figure 5:
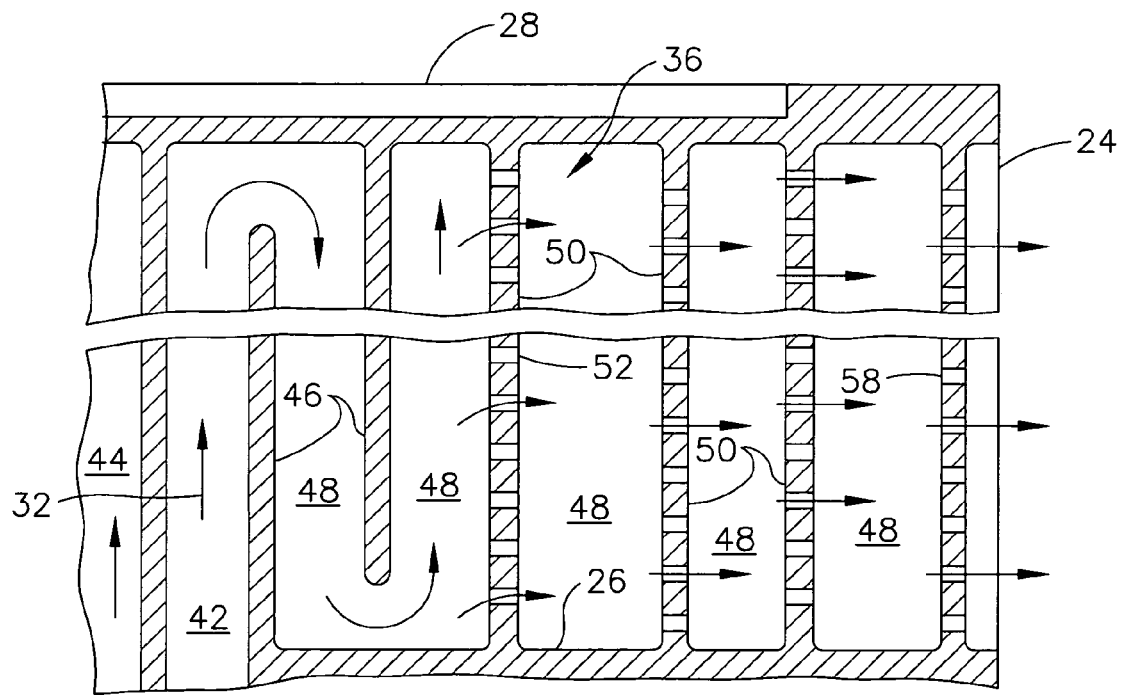
FIG. 5 is an elevational sectional view of a portion of the suction-side circuit of the airfoil illustrated in FIG. 2 and taken along line 5-5.

FIG. 4 illustrates in elevation the three serpentine channels 40,48,48 of the first circuit 34; and FIG. 5 illustrates the three serpentine channels 42,48,48 of the second circuit 36. Serpentine cooling circuits are well known in general, and the two three-pass circuits 34,36 shown in these figures have corresponding inlet channels 40,42 extending radially outwardly from the base of the dovetail. However, those two inlets join the third inlet channel 44 as described above to initially cool the hump region of the airfoil.

The inlet legs of the two serpentine circuits then join in series flow with their corresponding second legs at corresponding flow turns or bends defined at the top of the short partitions 46 which terminate just below the airfoil tip. The flow then changes direction and flows downwardly or radially inwardly against the direction of centrifugal force.

At the bottom of the second serpentine legs, the flow again changes direction radially outwardly into the third or last legs at the corresponding flow turns or bends defined at the bottom of the short partitions 46 which terminate just above the root 26 of the airfoil.

FIG. 2 illustrates that the common imperforate partitions 46 from the first and second circuits 34,36 divide the airfoil 12 substantially equally along the camber line of the airfoil, and are coplanar with the perforate partition 50 in the third circuit 38 that joins the suction sidewall 20 behind the leading edge. In this way, the two inlet channels 40,42 equally divide the airfoil laterally between the pressure and suction sides, and back the first two channels of the third circuit 38.

The corresponding second channels 48 of the two serpentine circuits 34,36 continue the lateral division of the airfoil and back each other along the common imperforate partition 46. And the third or last channels 48 of the two serpentine circuits continue the lateral division of the airfoil and back each other along the common imperforate partition 46 therebetween.

In this way, the airfoil is divided laterally in half between the opposite sidewalls, and each of the two serpentine channels that collectively bridge those two sidewalls has a substantially double aspect ratio, compared with a single, non-divided flow channel. The aspect ratio represents the width of the channel laterally between the two sidewalls divided by the depth or length of the channel along the camber line.

The smaller aspect ratio of each channel correspondingly moves the faster center region of the cooling air closer to the respective sidewalls for increasing their heat transfer cooling of the internal surfaces of the sidewalls.

Furthermore, the imperforate partitions 46 that laterally bridge the opposite sidewalls are themselves coplanar and position the three legs of each serpentine circuit back to back to each other so the cooling flow travels directly in parallel flow between the corresponding first, second, and third legs of each serpentine circuit.

The first three serpentine legs or passes are therefore closely in parallel with each other in turn, which correspondingly reduces pressure and temperature differences between the two circuits. This in turn will reduce the thermal gradients between partitions of the pressure-side circuit 34 and the suction-side circuit 36. And, reduced thermal gradients reduces thermal stress and improves durability.

The three-pass serpentine circuits experience less pressure drop than impingement cooling, and therefore the spent serpentine air may be used for additional cooling prior to discharge from the airfoil.

For example, the first circuit 34 may further include an array of pins 54 arranged in a rectangular grid or mesh in flow communication with the last serpentine leg 48 as shown in FIGS. 2 and 4. Mesh pin cooling is also conventional, yet requires sufficient air pressure to accommodate the corresponding pressure drop of the cooling air to ensure sufficient backflow margin over the external combustion gases.

The three-pass first serpentine circuit 34 initially cools the pressure side of the airfoil, with its spent air then being used in the mesh pins 54 for preferentially cooling this aft portion of the airfoil where the opposite sidewalls converge and decrease in width to the thin trailing edge.

Correspondingly, the second serpentine circuit 36 may further include multiple cascade channels 48 joined in series flow communication with the last serpentine leg thereof as shown in FIGS. 2 and 5. The cascade channels are separated from each other by corresponding perforate partitions 50, each including a row of the impingement holes 52 for cascade impingement cooling the inner surface of the airfoil chordally therealong.

In the exemplary embodiment, there are three additional cascade channels 48 following in series the first three legs of the second serpentine circuit 36, each provided with a row of impingement holes 52 that effect three stages of pressure drop therefrom. Since the three serpentine legs have relatively low pressure drop, the spent serpentine air can retain sufficient driving pressure to drive the following three stages of impingement cooling, or fewer stages as desired.

As best shown in FIG. 2, the third circuit 38 is disposed along the suction sidewall 20 and terminates at the leading edge 22. The first circuit 34 extends along the pressure sidewall 18 behind the third circuit and terminates suitably before the trailing edge 24.

The second circuit 36 commences behind the third circuit 38 near the midchord of the airfoil and extends along the suction sidewall 20, and terminates at the trailing edge 24. The first and second circuits 34,36 thusly are disposed behind the third circuit 38, and extend in parallel along the two opposite sides 18,20 of the airfoil both terminating at or near the trailing edge 24.

In this configuration shown in FIG. 2 the first and second circuits 34,36 share a common imperforate partition 46 between the mesh pins 54 and the first one of the cascade channels 48. This partition 46 terminates the lateral division of the airfoil along the camber line in the thin region of the trailing edge, and the second circuit 36 terminates in the last two flow channels 48 thereof which fully bridge the two sidewalls forward of the trailing edge.

The first and second circuits 34,36 complement each other in serpentine cooling performance as disclosed above. And, the second and third circuits 36,38 similarly include local cascade impingement cooling for the high heat flux leading edge and the thin trailing edge regions.

The spent impingement air in the first cascade channels of the two circuits 36,38 is then discharged through the next row of impingement holes into the second or successive cascade channel. The impingement holes for the cascade channels are suitably inclined laterally in the partitions for maximizing impingement cooling of the air against the next portion of the airfoil inner surface, both near the leading edge and the trailing edge.

In cascade fashion then, the impingement holes transfer the cooling air from channel to channel and are suitably inclined in the partitions for repeating impingement cooling of the successive portions of the inner surface of the airfoil.

In this way, the same cooling air is used in series or successively to provide cascade impingement cooling of the corresponding portions of the inner surface of the airfoil along the local portions of the two circuits 36,38. Both the imperforate and perforate partitions 46,50 are integral portions of the commonly cast airfoil and enjoy substantial strength for withstanding the significant centrifugal loads generated during operation.

And, cascade impingement cooling is effected from the multiple partitions for increasing the surface area coverage for which impingement cooling may be introduced in the common airfoil without the need for an independent impingement baffle as typically found in stationary turbine nozzle vanes.

Accordingly, the three cooling circuits 34,36,38 complement each other for both enhanced cooling of the airfoil while maintaining strength thereof to withstand the centrifugal forces during operation, and also provide relatively large channels which can be readily cast into the blade during manufacture. The cooling circuits provide enhanced internal cooling of the inner surfaces of the airfoil, independently of any external cooling provided therefor.

The three circuits may be varied in configuration to address the specific needs of a given turbine blade in its operating environment, and may include additional conventional features such as internal turbulators and pins for enhancing internal heat transfer. In order to discharge the internal cooling air from the three circuits 34,36,38, each of those circuits terminates in one or more corresponding rows of suitable outlet holes extending through the airfoil 12.

For example, the suction sidewall 20 illustrated in FIGS. 2 and 3 may include one row of film cooling holes 56 disposed in flow communication with the last channel of the third circuit 38. Another row of the film cooling holes 56 may also be disposed through the pressure sidewall 18 in flow communication with the last channel of the third circuit 38. In this way, the two rows of film cooling, or gill, holes 56 provide outlets to the leading edge cooling circuit for discharging the spent impingement air in external films along the pressure and suction sides of the airfoil for providing conventional film cooling thereof.

Similarly, the pressure sidewall 18 illustrated in FIG. 2 may include another row of the film cooling holes 56 disposed in flow communication with the last channel of the first circuit 34 for providing an outlet therefor and generating additional external film cooling air over the pressure sidewall downstream therefrom.

The second circuit 36 illustrated in FIGS. 2 and 5 may terminate in a row of trailing edge outlet holes 58 disposed along the trailing edge 24 in any conventional configuration for discharging the spent impingement air from that circuit.

The pressure and suction sidewalls 18,20 illustrated in FIG. 2 are preferably imperforate along the three inlet channels 40-44 so that all of the incoming cooling air may be separately discharged after flow therethrough in the remainder of the three circuits themselves.

Also in the preferred embodiment, the pressure and suction sidewalls 18,20 are imperforate along the three cooling circuits 34-38 except at the corresponding last flow channels thereof which have the corresponding rows of outlet holes 56,58 disclosed above.

In alternate embodiments, additional rows of film cooling holes may be provided in the pressure or suction sidewalls, or both, in flow communication with various ones of the intermediate flow channels to match the local variations in heat load on the airfoil. The various cooling circuits may also include conventional short ribs or turbulators along the inner surfaces of the sidewalls for enhancing heat transfer where possible.

As indicated above, turbine rotor blades, and in particular first stage high pressure turbine rotor blades are subject to the highest temperature combustion gases discharged from the combustor. The differently configured pressure and suction sides of the rotor blades experience different heat loads therein from the combustion gases which flow thereover during operation. The ability to divide the airfoil into the multiple cooling circuits described above permits tailoring of the cooling effectiveness thereof as required for the corresponding different heat loads in the different portions of the airfoil.

The cascade impingement channels may be used locally where desired in the different portions of the airfoil for locally maximizing the surface area for successive or cascade impingement cooling. The cascade channels are preferably combined with serpentine cooling circuits as disclosed above where desired for matching the external heat loads on the airfoil.

Impingement cooling results in a significant pressure drop as the impingement air is discharged through a corresponding row of impingement holes in each stage of impingement. Successive stages of impingement result in additional pressure drops of the cooling air. And, the number of successive or cascade impingement stages is limited by the available pressure of the inlet cooling air relative to the local pressure of the combustion gases outside the airfoil.

In the exemplary embodiment illustrated in FIG. 2, the three circuits commence near the maximum width of the airfoil behind the leading edge, with the first and second circuits 34,36 terminating near or at the trailing edge 24, and the third circuit 38 terminating near the leading edge.

The two-stage third circuit 38 experiences two impingement air pressure drops prior to discharge from the film cooling holes 56 along the pressure and suction sidewalls.

The second circuit 36 experiences pressure drop initially through the three serpentine legs, followed in turn by three more pressure drops in the three stages of impingement cooling prior to discharge from the outlet holes 58. And, the first circuit 34 similarly experiences pressure drop initially in the three serpentine legs, followed in turn by pressure drop in the array of mesh pins 54 prior to discharge from the outlet holes 56.

Since the first and second circuits 34,36 commonly discharge the spent impingement air near the airfoil trailing edge 24, they enjoy the advantage of the decrease in external pressure of the combustion gases in this region for maximizing the pressure drop between the inlet air and the outlet air.

The three cooling circuits disclosed above may be used for particular advantage in high performance gas turbine engines in which the compressors thereof generate high pressure cooling air sufficient for accommodating the multiple pressure drops therethrough. The cooperation of serpentine, mesh, and cascade cooling may be used to reduce the pressure requirements from the compressor, and may be varied in alternate designs to accommodate the available pressure drop in other types of gas turbine engines.

The three circuits described above may be conventionally cast in the turbine blade using three ceramic cores specifically configured therefor and joined together for the casting process. The various outlet holes in the airfoil may be formed after casting of the blade itself by any conventional drilling process.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A turbine blade comprising:
   an airfoil integrally joined to a mounting dovetail;
   said airfoil including opposite pressure and suction sidewalls joined together at chordally opposite leading and trailing edges and extending longitudinally in span from root to tip;
   a first serpentine cooling circuit disposed inside said airfoil along said pressure sidewall;
   a second serpentine cooling circuit disposed inside said airfoil along said suction sidewall in parallel with said first circuit, and sharing common partitions therewith;
   a third cooling circuit disposed between said leading edge and said first and second circuits, and separated from each other by imperforate partitions in independent circuits; and
   each of said first, second, and third circuits terminates in a corresponding row of outlet holes extending through said airfoil in flow communication with a corresponding outlet channel thereof.

2. A blade according to claim 1 wherein:
   each of said circuits includes an inlet channel collectively grouped together in the maximum width region of said airfoil; and
   each of said circuits further includes multiple channels joined in series flow from said inlet channels, and extending forward to said leading edge and aft to said trailing edge, respectively, in flow communication with said outlet holes thereof.

3. A blade according to claim 2 wherein said first and second serpentine circuits each includes three legs extending along said airfoil span, and corresponding legs thereof adjoin each other at common imperforate partitions.

4. A blade according to claim 3 wherein:
   said first and second serpentine circuits are separated from said leading edge by said third circuit; and
   said common imperforate partitions from said first and second circuits divide said airfoil substantially equally, and are coplanar with a perforate partition in said third circuit joined to said suction sidewall.

5. A blade according to claim 4 wherein said third circuit comprises multiple cascade channels separated by corresponding perforate partitions, each including a row of impingement holes for cascade impingement cooling the inner surface of said airfoil chordally therealong.

6. A blade according to claim 5 wherein said second circuit further includes multiple cascade channels joined in series flow communication with the last serpentine leg thereof, and separated from each other by corresponding perforate partitions, each including a row of impingement holes for cascade impingement cooling the inner surface of said airfoil chordally therealong.

7. A blade according to claim 6 wherein said first circuit further includes an array of pins arranged in a mesh in flow communication with the last leg thereof.

8. A blade according to claim 7 wherein said first and second circuits share a common imperforate partition between said mesh pins and one of said cascade channels.

9. A blade according to claim 8 wherein said pressure and suction sidewalls are imperforate along said inlet channels.

10. A blade according to claim 9 wherein said pressure and suction sidewalls are imperforate along said three cooling circuits except at the corresponding last channels thereof having said rows of outlet holes.

11. A turbine blade comprising:
    an airfoil integrally joined to a mounting dovetail;
    said airfoil including opposite pressure and suction sidewalls joined together at chordally opposite leading and trailing edges and extending longitudinally in span from root to tip;
    a first serpentine cooling circuit disposed inside said airfoil along said pressure sidewall;
    a second serpentine cooling circuit disposed inside said airfoil along said suction sidewall in parallel with said first circuit, and sharing common partitions therewith; and
    a third cooling circuit disposed between said leading edge and said first and second circuits, and separated from each other by imperforate partitions in independent circuits.

12. A blade according to claim 11 wherein:
    each of said circuits includes an inlet channel collectively grouped together in the maximum width region of said airfoil; and
    each of said circuits further includes multiple channels joined in series flow from said inlet channels, and extending forward to said leading edge and aft to said trailing edge, respectively.

13. A blade according to claim 12 wherein said first and second serpentine circuits each includes three legs extending along said airfoil span, and corresponding legs thereof adjoin each other at common imperforate partitions.

14. A blade according to claim 13 wherein said first and second serpentine circuits are separated from said leading edge by said third circuit.

15. A blade according to claim 14 wherein each of said first, second, and third circuits terminates in a corresponding row of outlet holes extending through said airfoil.

16. A blade according to claim 15 wherein said third circuit comprises multiple cascade channels separated by corresponding perforate partitions, each including a row of impingement holes for cascade impingement cooling the inner surface of said airfoil chordally therealong.

17. A blade according to claim 15 wherein said second circuit further includes multiple cascade channels joined in series flow communication with the last serpentine leg thereof, and separated from each other by corresponding perforate partitions, each including a row of impingement holes for cascade impingement cooling the inner surface of said airfoil chordally therealong.

18. A blade according to claim 15 wherein said first circuit further includes an array of pins arranged in a mesh in flow communication with the last leg thereof.

19. A blade according to claim 15 wherein said pressure and suction sidewalls are imperforate along said inlet channels.

20. A blade according to claim 15 wherein said pressure and suction sidewalls are imperforate along said three cooling circuits except at the corresponding last channels thereof having said rows of outlet holes.

* * * * *